(12) United States Patent
Nolan

(10) Patent No.: US 7,574,582 B2
(45) Date of Patent: Aug. 11, 2009

(54) PROCESSOR ARRAY INCLUDING DELAY ELEMENTS ASSOCIATED WITH PRIMARY BUS NODES

(75) Inventor: John Matthew Nolan, Bath (GB)

(73) Assignee: Picochip Designs Limited, Bath (GB)

( * ) Notice: Subject to any disclaimer, the term of this patent is extended or adjusted under 35 U.S.C. 154(b) by 0 days.

(21) Appl. No.: 10/543,370

(22) PCT Filed: Jan. 26, 2004

(86) PCT No.: PCT/GB2004/000255

§ 371 (c)(1),
(2), (4) Date: Jul. 26, 2005

(87) PCT Pub. No.: WO2004/068362

PCT Pub. Date: Aug. 12, 2004

(65) Prior Publication Data

US 2006/0155956 A1     Jul. 13, 2006

(30) Foreign Application Priority Data

Jan. 27, 2003    (GB)  ............................... 0301863.7

(51) Int. Cl.
*G06F 15/80*      (2006.01)
*G06F 15/163*     (2006.01)

(52) U.S. Cl. ............................. 712/16; 712/18; 712/31
(58) Field of Classification Search ................ 712/16, 712/18, 31
See application file for complete search history.

(56) References Cited

U.S. PATENT DOCUMENTS 4,380,046 A *   4/1983   Frosch et al. ................. 712/22
4,574,345 A     3/1986   Konesky
4,622,632 A *   11/1986   Tanimoto et al. ............... 712/11

(Continued)

FOREIGN PATENT DOCUMENTS

JP     A-8-297652     11/1996

(Continued)

OTHER PUBLICATIONS

Kober, Rudolf, "Multiprocessor System SMS 201—Combining 128 Microprocessors to a Powerful Computer," Sep. 1977, Compcon '77, pp. 225-230.*

(Continued)

*Primary Examiner*—Eddie P Chan
*Assistant Examiner*—Keith Vicary
(74) *Attorney, Agent, or Firm*—Potomac Patent Group PLLC

(57) ABSTRACT

There is disclosed a processor array, which achieves an approximately constant latency. Communications to and from the farthest array elements are suitably pipelined for the distance, while communications to and from closer array elements are deliberately "over-pipelined" such that the latency to all end-point elements is the same number of clock cycles. The processor array has a plurality of primary buses, each connected to a primary bus driver, and each having a respective plurality of primary bus nodes thereon; respective pluralities of secondary buses, connected to said primary bus nodes; a plurality of processor elements, each connected to one of the secondary buses; and delay elements associated with the primary bus nodes, for delaying communications with processor elements connected to different ones of the secondary buses by different amounts, in order to achieve a degree of synchronization between operation of said processor elements.

17 Claims, 5 Drawing Sheets

U.S. PATENT DOCUMENTS

| | | | | |
|---|---|---|---|---|
| 4,720,780 | A * | 1/1988 | Dolecek | 712/18 |
| 4,736,291 | A * | 4/1988 | Jennings et al. | 712/11 |
| 4,814,970 | A * | 3/1989 | Barbagelata et al. | 712/28 |
| 4,825,359 | A * | 4/1989 | Ohkami et al. | 712/15 |
| 4,890,279 | A * | 12/1989 | Lubarsky | 370/249 |
| 4,943,912 | A * | 7/1990 | Aoyama et al. | 712/16 |
| 4,992,933 | A * | 2/1991 | Taylor | 712/22 |
| 5,036,453 | A * | 7/1991 | Renner et al. | 712/16 |
| 5,109,329 | A * | 4/1992 | Strelioff | 710/261 |
| 5,152,000 | A * | 9/1992 | Hillis | 712/11 |
| 5,265,207 | A * | 11/1993 | Zak et al. | 712/15 |
| 5,384,697 | A * | 1/1995 | Pascucci | 700/10 |
| 5,570,045 | A * | 10/1996 | Erdal et al. | 326/93 |
| 5,719,445 | A * | 2/1998 | McClure | 257/723 |
| 5,752,067 | A * | 5/1998 | Wilkinson et al. | 712/16 |
| 5,790,879 | A * | 8/1998 | Wu | 712/19 |
| 5,805,839 | A * | 9/1998 | Singhal | 710/112 |
| 6,052,752 | A * | 4/2000 | Kwon | 710/306 |
| 6,122,677 | A * | 9/2000 | Porterfield | 710/10 |
| 6,175,665 | B1 | 1/2001 | Sawada | |
| 6,393,026 | B1 * | 5/2002 | Irwin | 370/401 |
| 6,928,500 | B1 * | 8/2005 | Ramanujan et al. | 710/107 |

FOREIGN PATENT DOCUMENTS

| | | |
|---|---|---|
| WO | 2 370 380 A | 6/2002 |
| WO | WO 02/50624 A2 | 6/2002 |
| WO | WO 02/50624 A3 | 6/2002 |

OTHER PUBLICATIONS

Knight, Thomas and Wu, Henry, "A Method for Skew-free Distribution of Digital Signals using Matched Variable Delay Lines," VLSI Circuits, 1993. Digest of Techinical Papers. 1993 Symposium on, May 1993, pp. 19-21.*

Hierarchical multiprocessor organizations; J. Archer Harris; David R. Smith ; International Symposium on Computer Architecture ;Proceedings of the 4th annual symposium on Computer architecture pp. 41-48 Year of Publication: 1977.*

"Hierarchical Interconnection Networks for Multicomputer Systems" Sivarama P. Dandamudi et. al. IEEE Transactions on Computers archive vol. 39 , Issue 6 (Jun. 1990)pp. 786-797 Year of Publication: 1990.*

A Cluster Structure as an Interconnection Network for Large Multimicrocomputer Systems Wu, S.B. Liu, M.T. This paper appears in: Transactions on Computers Publication Date: Apr. 1981 vol. C-30, Issue: 4 On pp. 254-264.*

Performance Analysis of Multilevel Bus Networks for Hierarchical Multiprocessors S. M. Mahmud IEEE Transactions on Computers archive vol. 43 , Issue 7 (Jul. 1994) pp. 789-805 Year of Publication: 1994.*

Performance Analysis of a Generalized Class of M-Level Hierarchical Multiprocessor Systems I.O. Mahgoub A.K. Elmagarmid Mar. 1992 (vol. 3, No. 2) pp. 129-138.*

"Data management in hierarchical bus networks" F. Meyer auf der Heide et al.; ACM Symposium on Parallel Algorithms and Architectures, Proceedings of the twelfth annual ACM symposium on Parallel algorithms and architectures, pp. 109-118 Year of Publication: 2000.*

Written Opinion and International Search Report of PCT/GB2004/000255 dated Mar. 22, 2004.

* cited by examiner

PROCESSOR ARRAY INCLUDING DELAY ELEMENTS ASSOCIATED WITH PRIMARY BUS NODES

BACKGROUND

This invention relates to a processor array, and in particular to a large processor array which requires multi-bit, bidirectional, high bandwidth communication to one processor at a time, to all the processors at the same time or to a sub-set of the processors at the same time. This communication might be needed for data transfer, such as loading a program into a processor or reading back status or result information from a processor, or for control of the processor array, such as the synchronous starting, stopping or singlestepping of the individual processors.

GB-A-2370380 describes a large processor array, in which each processor (array element) needs to store the instructions which make up an operating program, and then needs to be controllable so that it runs the operating program as desired. Since the array elements pass data from one to another, it is essential that the processors are at least approximately synchronised. Therefore, they must be started (i.e. commence running their programs) at the same time. Likewise, if they are to be stopped at some time and then re-started, they need to be stopped at the same time.

Due to the large number of array elements, and the relatively large size of their instruction stores, data stores, register files and so on, it is advantageous to be able to load the program for each array element quickly.

Due to the size of the processor array it is difficult to minimise the amount of clock skew between each array element and, in fact, it is advantageous from the point of view of supplying power to the array elements to have a certain amount of clock skew. That is, it is necessary for the array elements to be synchronised to within about one clock cycle of each other.

For synchronous control of an array of processors, the simplest solution would be to wire the control signals to all array elements in a parallel fan-out. This has the limitation of becoming unwieldy once the array is larger than a certain size. Once the distance the signals have to travel is so long as to cause the signals to take longer than one clock cycle to reach the most distant array elements, it becomes difficult to pipeline the control signals efficiently and to balance the endpoint arrival times over all operating conditions. This imposes an upper limit on the clock speed that can be used, and hence the bandwidth of communications. Additionally, this approach is not well suited to being able to talk to just one processor at a time in one mode and then to all processors at once in another mode.

For high bandwidth communications to multiple endpoints, packet-switched or circuit-switched networks are a good solution. However, this approach has the disadvantage of not generally being synchronous at all the end-points. The latency to end-points further away is longer than to end-points that are close. This also requires the nodes of the network to be quite intelligent and hence complex.

It is also necessary to consider the issue of scaleability. A design that works well in one processor array may have to be completely redesigned for a slightly larger array, and may be relatively inefficient for a smaller array.

DETAILED DESCRIPTION

Figure 1:
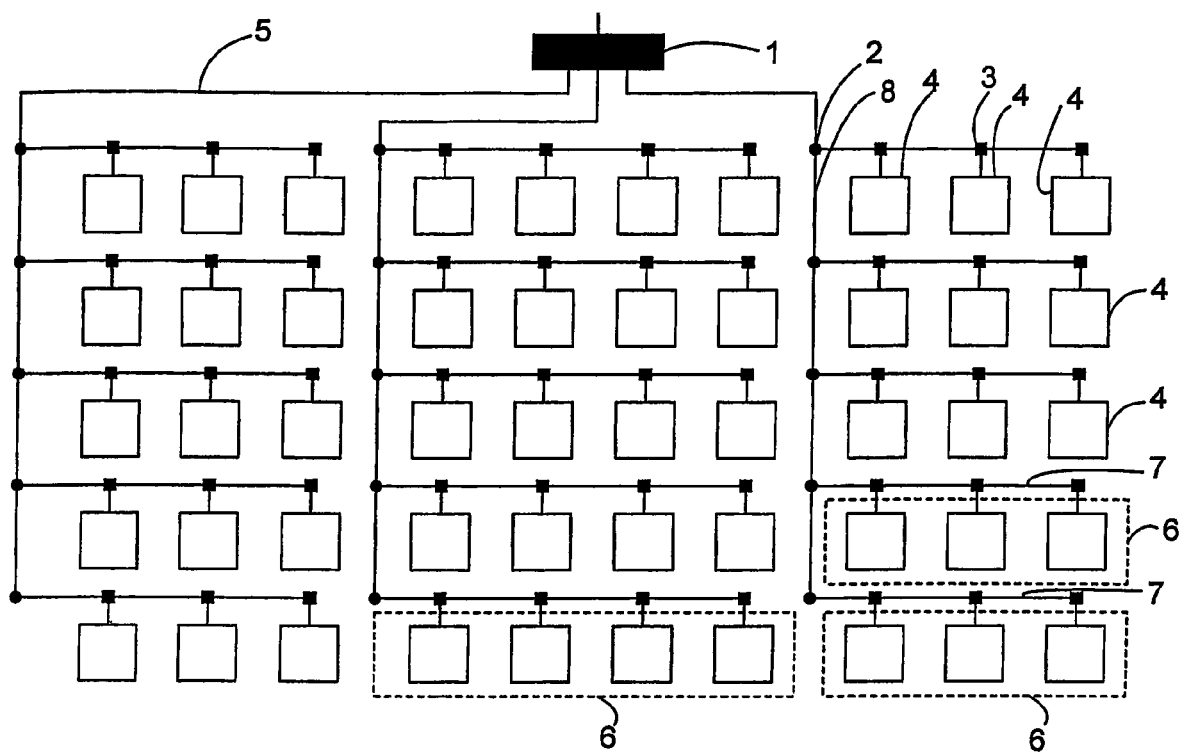
FIG. 1 is a block schematic diagram of a processor array according to the present invention.

FIG. 1 shows an array of processors 4, which are all connected to a column driver 1 over buses 5. As illustrated, the array is made up of horizontal rows and vertical columns of array elements 4, although the actual physical positions of the array elements are unimportant for this invention. Each row of array elements has been divided into sub-groups 6. The array elements 4 within one sub-group 6 are connected together on a horizontal bus segment 7 via respective row nodes 3. The horizontal bus segments 7 are connected to vertical buses 8 via respective column nodes 2. Each sub-group 6 contains array elements with which the column node 2 can easily communicate within a single clock cycle. Thus, the vertical buses 8 act as primary buses, the column nodes 2 act as primary bus nodes, the horizontal bus segments 7 act as secondary buses, and the row nodes 3 act as secondary bus nodes.

Each vertical bus 8 is driven individually by the column driver 1, as will be described in more detail below with reference to FIG. 5. This serves as part of the communication routing and as a means of conserving power.

Each of the buses 5, 7, 8 is in fact a pair of uni-directional, multi-bit buses, one in each direction, although they are shown as a single line for clarity.

Figure 2:
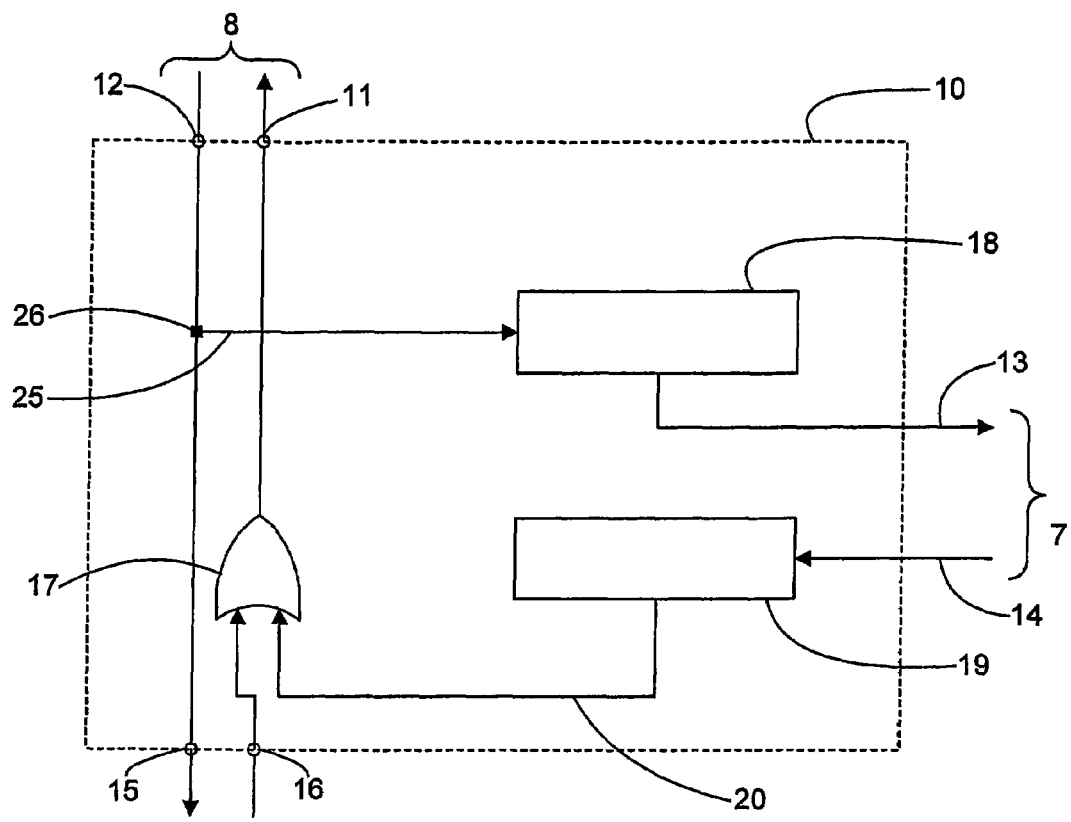
FIG. 2 is a block schematic diagram of a first embodiment of a primary node in the array of FIG. 1.
Figure 3:
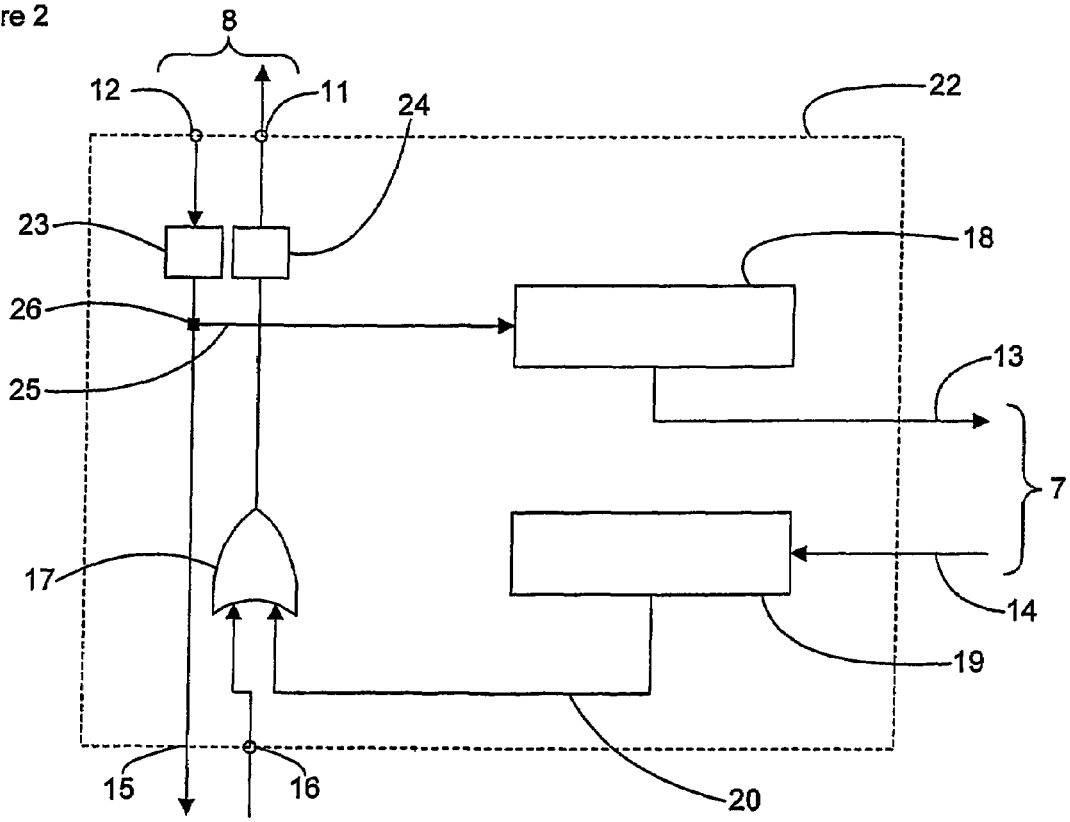
FIG. 3 is a block schematic diagram of a second embodiment of a primary node in the array of FIG. 1.

The column nodes 2 take two different forms, shown in FIGS. 2 and 3 respectively. FIG. 2 shows a column node without a vertical pipeline stage, while FIG. 3 shows a column node with a vertical pipeline stage.

In the column node 10 shown in FIG. 2, the outgoing part of the vertical bus 8, carrying data from the column driver 1, propagates straight through the node 10 from an inlet 12 to an outlet 15. It is also tapped off, at a connection 26, to a further bus 25. The bus 25 is connected to an outgoing part 13 of the horizontal bus segment 7 via a short, tapped delay line 18. The tapped delay line 18 allows the signal to the horizontal bus segment 7 to be delayed by a predetermined integer number of clock cycles. The return path part 14 of the horizontal bus segment 7, carrying data to the column driver 1, is also passed through a short, tapped delay line 19 to connect to a bus 20. The delay line 19 delays the return signal by a predetermined integer number of clock cycles. The delay in the delay line 19 is preferably the same as the delay in the delay line 18, although the delay in the delay line 19 could be chosen to be different from the delay in the delay line 18, provided that the delays in the different nodes 10 are set so that there is the same total delay when sending signal to all end points, and when receiving signals from all end points. The bus 20 is combined with the return path of the vertical bus received at an input 16 in a bitwise, logical OR function 17 to form a return path vertical bus signal for output 11.

FIG. 3 shows an alternative form of column node 22. Features of the column node 22, which have the same functions as features of the column node 10 shown in FIG. 2, are indicated by the same reference numerals, and will not be described again below. Compared with the column node 10, the column node 22 has a vertical pipeline stage. Thus, there is a pipeline register 23 inserted in the outgoing part of the vertical bus 8, which delays outgoing signals by one clock cycle, and a pipeline register 24 inserted in the return path of the vertical bus 8, which similarly delays return signals by one clock cycle.

Both of the types of column node 10, 22 provide a junction between the vertical bus 8 and the horizontal bus segments 7 for the sub-groups 6 of array elements 4. The column node 22 which has a vertical pipeline stage allows the total vertical bus path to be longer than a single clock cycle. The column node 10 without the vertical pipeline stage allows the junction to be provided without adding a pipeline stage to the vertical bus path. Using the two types of column node in conjunction with each other, as described in more detail below, allows sufficient pipelining to enable high bandwidth communications without having to reduce the clock speed, but without an unnecessarily large and hence inefficient total pipeline depth.

Figure 4:
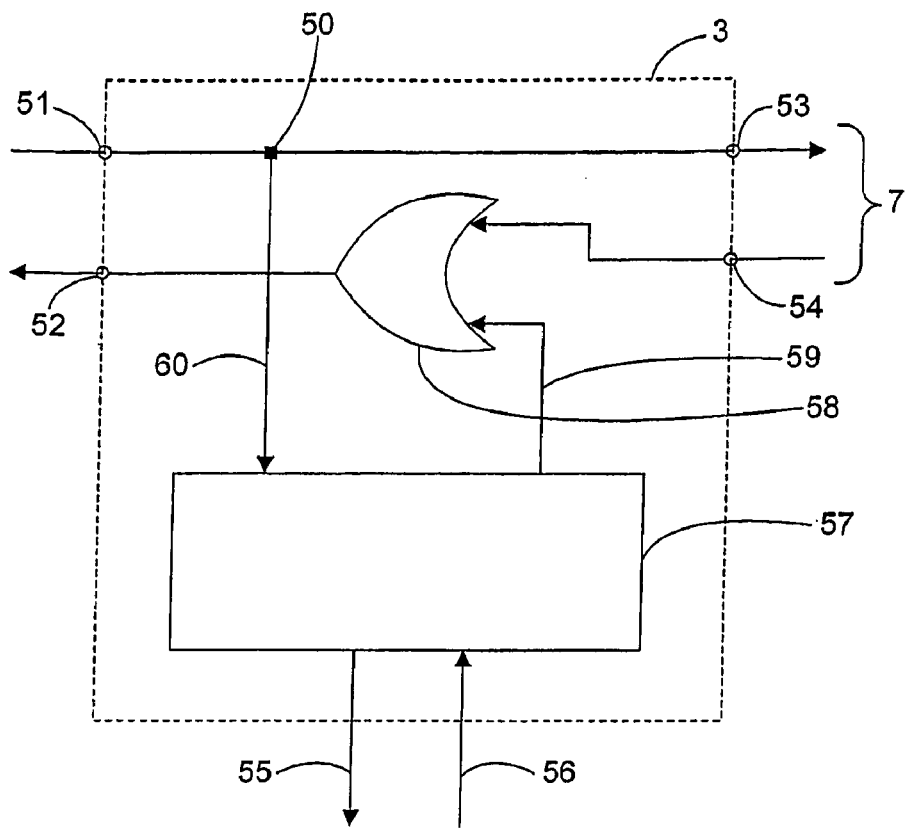
FIG. 4 is a block schematic diagram of a secondary node in the array of FIG. 1.

FIG. 4 shows in more detail a row node 3, of the type shown in FIG. 1. The outgoing part of the horizontal bus 7, carrying data from the column driver 1, propagates straight through the node from an inlet 51 to an outlet 53. It is also tapped off, at a connection 50, to a further bus 60. The bus 60 is connected to an array element interface 57.

The array element interface 57 connects to one of the array elements, as shown in FIG. 1, via buses 55 and 56. The array element interface 57 interprets the bus protocol to determine if received communications are intended for the specific array element, which is connected to this row node. Information which is read back from the array element connected to this row node 3 is received in the interface 57, and output on a bus 59. A return path part of the horizontal bus 7, carrying data towards the column driver 1, is received at an input 54. The bus 59 is combined with the return path of the horizontal bus 7 in a bitwise, logical OR function 58 to form a return path horizontal signal for output 52.

Figure 5:
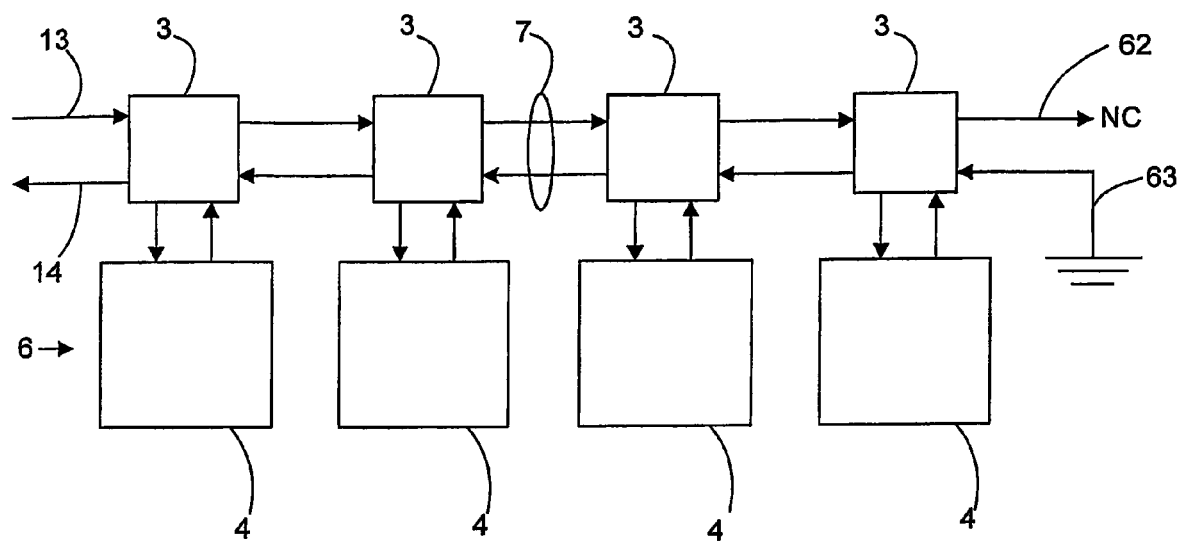
FIG. 5 is a more detailed block schematic diagram of a part of the array of FIG. 1.

FIG. 5 shows in more detail one of the row sub-groups 6, shown in FIG. 1. In this illustrated example, the sub-group 6 contains four array elements 4, although there may be more or less than four elements in a sub-group, depending upon the number of elements with which the column driver 1 can communicate effectively in a single clock cycle. The four array elements 4 are connected to the horizontal bus 7 via respective row nodes 3. Data is received on the outgoing horizontal bus segment 13 (shown in FIGS. 2 and 3), and output on the return path part 14 (also shown in FIGS. 2 and 3) of the horizontal bus segment 13. The outgoing horizontal bus segment is left not connected at the far end 62. The return path horizontal bus segment is terminated with logical all-zeros, or grounded, at its far end 63. This is to avoid corruption of any return path data, which may be logically ORed onto the bus 7 via any of the horizontal nodes 3.

Figure 6:
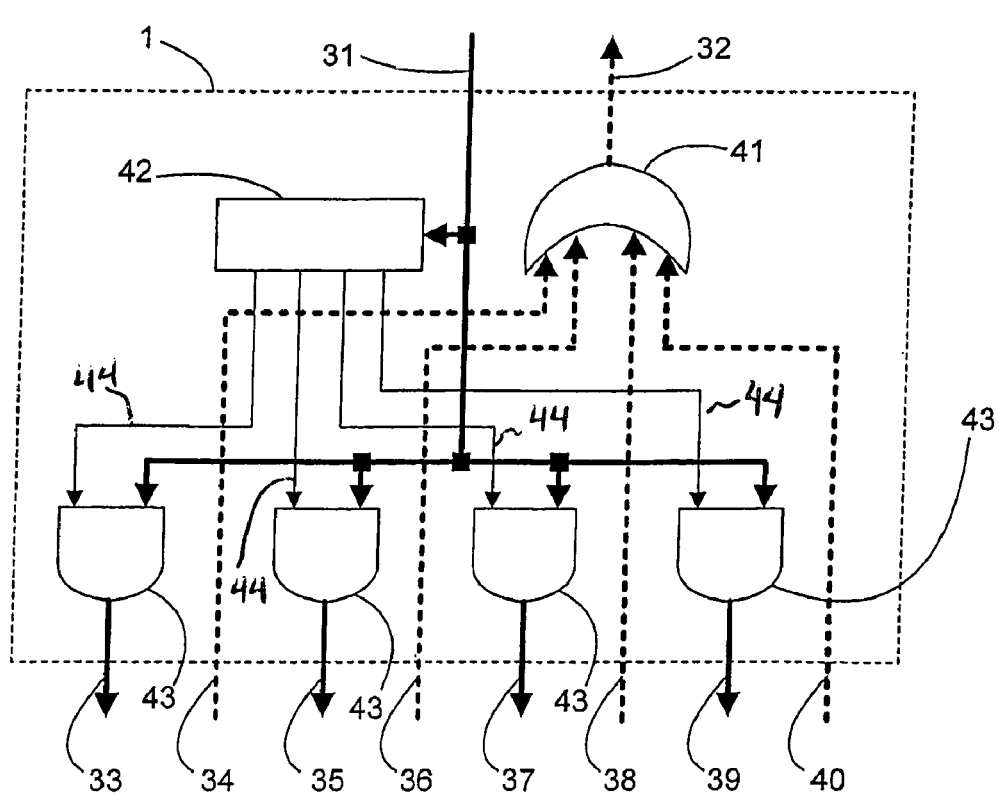
FIG. 6 is a more detailed block schematic diagram of a second part of the array of FIG. 1.

FIG. 6 shows in more detail the column driver 1 from FIG. 1. In this illustrated example, the number of columns is four, but the number of columns could be more or less than four. Outgoing data for the array elements 4 is received from an array control processor (not shown) on a bus 31, which is wired in parallel to the outgoing parts 33, 35, 37, 39 of each of the four vertical buses connected to the respective columns.

The bus 31 is connected to the outgoing parts 33, 35, 37, 39 via respective bitwise, logical AND functions 43. The logical AND functions 43 also receive enabling signals 44 from a protocol snooping block 42. The protocol snooping block 42 watches the communications on the bus 31 and, based on the address signals amongst the data, it generates enabling signals which enable each column individually or all together as appropriate.

The return path parts 34, 36, 38, 40 of each of the four vertical buses connected to the respective columns are combined in a bitwise, logical OR function 41 to generate the overall return path bus 32 to transfer data from the array elements 4 to the array control processor.

As shown in FIG. 6, the column driver connects to four columns. However, when the array contains a large number of elements 4, and/or the sub-groups 6 only contain small numbers of elements 4, the number of columns may become large. In that case, additional pipeline stages may be required to ensure that the delays to and from all of the end points remain the same. For example, additional pipeline registers could be provided in one or more of the branches 33-40, and/or at one or more of the inputs to the OR gate 41, and/or at the inputs to one or more of the AND gates 43.

The overall outgoing path bus is therefore a simple parallel connection with the addition of some pipeline stages and some high-level switching. The high level switching performs part of the array element addressing function, and helps to conserve power.

The overall return path bus is a simple logical OR fan-in with the addition of some pipeline stages. No arbitration is necessary because of the constant latency of the bus, because the array control processor will only read from one array element at a time, and because array elements that are not being addressed transmit logical all-zeros onto the bus.

This still allows tight pipelining of read accesses and avoids the use of tri-state buses.

Figure 7:
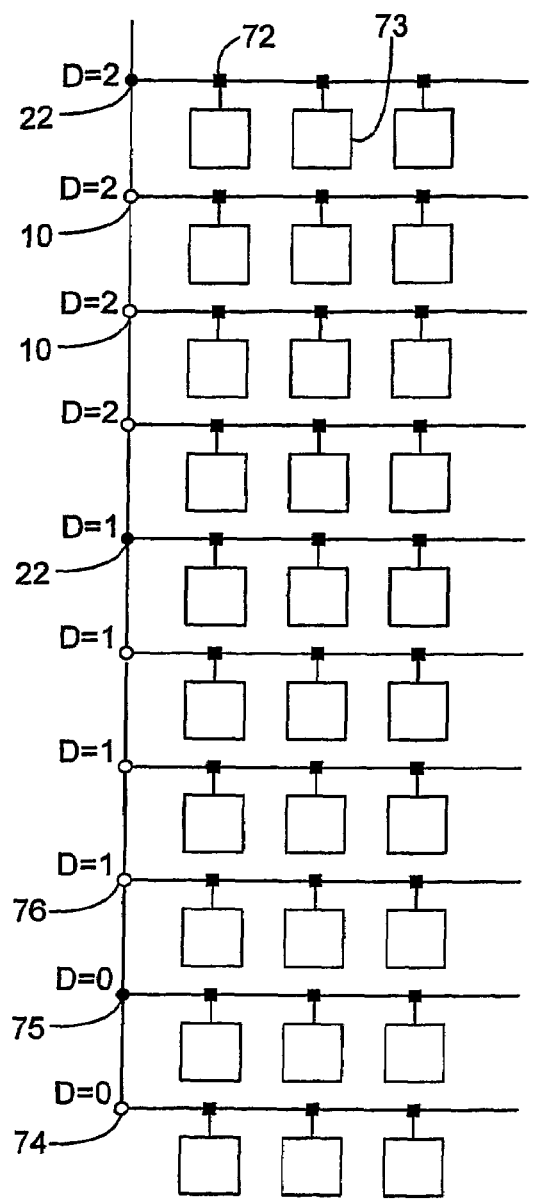
FIGS. 7 and 8 show parts of the array of FIG. 1, in use.
Figure 8:
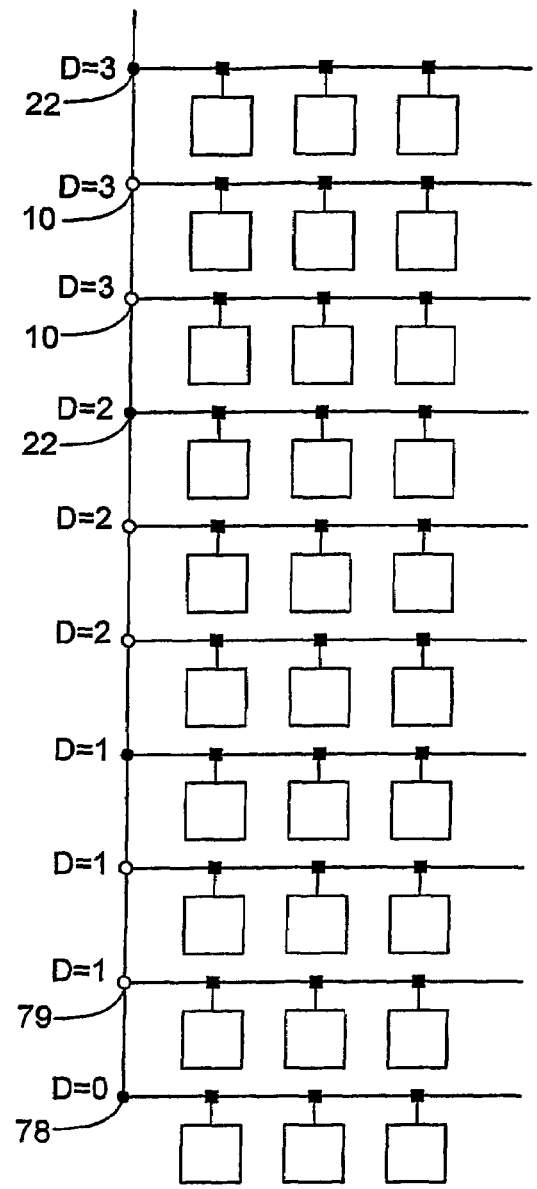

FIGS. 7 and 8 show two possible arrangements of column nodes. In both of these arrangements, the column nodes which are nearer to the column bus driver introduce longer delays, by way of their tapped delay lines, than the column nodes which are further from the column bus driver.

In FIG. 7, the column node which is closest to the column bus driver is a node 22 with a vertical pipeline stage, as shown in FIG. 3 and represented in FIG. 7 by a solid circle, and each fourth column node thereafter also has a vertical pipeline stage, while the other column nodes are nodes 10 which do not have a vertical pipeline stage, as shown in FIG. 2 and represented in FIG. 7 by a circle. In FIG. 8, the column node which is closest to the column bus driver is a node 22 with a vertical pipeline stage, as shown in FIG. 3 and represented in FIG. 8 by a solid circle, and each third column node thereafter also has a vertical pipeline stage, while the other column nodes are nodes 10 which do not have a vertical pipeline stage, as shown in FIG. 2 and represented in FIG. 8 by a circle. The actual spacing of the nodes with a vertical pipeline stage would depend upon the physical implementation. The spacing should be chosen in order to use the minimum number of nodes with vertical pipeline stages whilst maintaining correct operation of the bus over all operating conditions. The nodes with vertical pipeline stages may be regularly spaced, or may be irregularly spaced, if required. This illustrates the scale-ability of this approach, since all that is changing is the overall latency, not the bandwidth.

FIGS. 7 and 8 also illustrate exemplary configurations of the tapped delay lines 18, 19 in each column node. In FIG. 7, starting at the column node which is most distant from the column bus driver 1, namely the node 74, the tapped delay lines 18, 19 have a delay time, D, which is set to the minimum delay time, namely 0 clock cycles in this example. Then, the delay times are allocated by moving up the column, and incrementing the delay time by 1 clock cycle each time a pipelined node 22 is passed. Thus, in FIG. 7, the tapped delay lines 18, 19 in the pipelined node 75 still have a delay time D=0, since the horizontal branch in this node is after the pipeline registers 23, 24. The next node 76 is configured with the tapped delay lines 18, 19 having a delay time D=1 clock cycle.

This process can be repeated until the column node nearest the column bus driver is reached. Thus, all of the end-points, on the horizontal bus segments, have the same latency to and from the top of the column.

A similar pattern of tapped delay line configuration can be seen in FIG. 8. Thus, in the column node 78 which is most distant from the column bus driver 1, the tapped delay lines 18, 19 have a delay time, D, which is set to the minimum delay time, namely 0 clock cycles in this example. Again, the delay times are allocated by moving up the column, and incrementing the delay time by 1 clock cycle each time a pipelined node 22 is passed. Thus, in FIG. 8, the node 79 is configured with the tapped delay lines 18, 19 having a delay time D=1 clock cycle. This process can be repeated until the column node nearest the column bus driver is reached.

When the delay time of a tapped delay line 18 is set to 0 clock cycles, the end points connected to that tapped delay line are in effect being driven by the preceding vertical bus pipeline register 23. This may increase the loading on the pipeline register excessively. Therefore, in practice, the minimum delay time in the tapped delay lines 18, 19 may be chosen as 1 clock cycle, rather than 0, in order to reduce this loading.

The addressing of individual array elements is encoded in the signals transferred over this bus structure as row, vertical bus column and sub-group column. The column bus driver 1 can decode the vertical bus column information to selectively enable the columns, or if a broadcast type address is used then it can enable all of the columns. The row nodes 3 decode the row information and sub-group column information—hence they must be configured with this information, derived from their placement. The column nodes 2 do not actively decode row information in this illustrated embodiment of the invention, since the power saving is not worth the complexity overhead at this granularity. However, in other embodiments, the column nodes could decode this information in the same way that the column drivers and the row nodes do, by snooping the bus protocol.

An array element is addressed if the bus activity reaches it, and all the address aspects match. If single addressing is used, the destination array element decodes the communication if the row address and the sub-group column address match its own. If a broadcast type address is used, in order to communicate to more than one array element, then the row nodes have to discriminate based on some other identification parameter, such as array element type. Broadcast addressing can be flagged either by a separate control wire, or by using "treserved"addresses, depending on which is most efficient.

Control of array elements, such as the synchronous starting, stopping or singlestepping, is achieved by writing specific data into control register locations within the array elements. To address these together, in a broadcast communication, these control locations must therefore be at the same place in each array element's memory map. It is useful to be able to issue a singlestep control command, instructing the array element to start for one step and then stop, because the addressing token overhead in the communications protocol prevents start and stop commands being so close together.

It can also be advantageous, in order to avoid problems caused by large clock skews, for example register setup or hold violations, by placing buffers (to speed up or to delay signals) at certain points in the nodes. For example, in the case of a column node as shown in FIG. 2 or 3, delay buffers may be inserted to prevent hold violations in buses 20 and 25, and in the vertical bus 8 before and after the tap point 26 and after the OR gate 17. In the case of a row node as shown in FIG. 4, delay buffers may be inserted to prevent hold violations in bus 59.

There is therefore provided an arrangement which achieves an approximately constant latency. Communications to and from the farthest array elements are suitably pipelined for the distance, while communications to and from closer array elements are deliberately "over-pipelined" such that the latency to all end-point elements is the same number of clock cycles. This allows a high bandwidth to be achieved, and is scaleable without having to redesign.

The communication itself takes the form of a tokenised stream and the processor array is seen as a hierarchical memory map, that is a memory map of array elements, each of which has its own memory map of program, data and control locations. The tokens are used to flag array element address, sub-address and read/write data. There are special reserved addresses for addressing all array elements (or subsets) in parallel for control functions.

A tokenised communications protocol, which may be used in conjunction with this processor array, is described in more detail below.

The outgoing bus is a 20 bit bus comprising 4 active-high flags and a 16 bit data field:

| Bit Range | Description - Outgoing Bus |
| --- | --- |
| [31:20] | Reserved. |
| [19] | AEID flag. Used to indicate that the payload data is an Array Element "ID" or address. |
| [18] | ADDR flag. Used to indicate that the payload data is a register or memory address within an Array Element. |
| [17] | READ flag. Used to indicate that a read access has been requested. The payload data will be ignored. |
| [16] | WRITE flag. Used to indicate that a write access has been requested. The payload data is the data to be written. |
| [15:0] | Payload data - Array Element address, Register/Memory address, data to be written. |

The return path is a 17 bit bus comprising an active-high valid flag and a 16 bit data field:

| Bit Range | Description - Return Path Bus |
| --- | --- |
| [16] | VALID flag. Indicates that the read access addressed an Array Element that exists. |
| [15:0] | Payload data - Data read back from register or memory location. |

The VALID flag is needed where the full address space of Array Elements is not fully populated. Otherwise it may be difficult to differentiate between a failed address and data that happens to be zero.

Basic Write Operation:—The sequence of commands to send over the outgoing bus is as follows:

AEID, <array element address>
ADDR, <register/memory location>
WRITE, <data word>

The user could write to multiple locations, one after another, by repeating the above sequence as many times as necessary:

AEID, <array element address 1>
ADDR, <register/memory location in array element 1>
WRITE, <data word>
AEID, <array element address 2>
ADDR, <register/memory location in array element 2>
WRITE, <data word>
etc.

If the AEID is going to be the same, there is no need to repeat it:

AEID, <array element address 1>
ADDR, <register/memory location 1>
WRITE, <data word for location 1 in array element 1>
ADDR, <register 1 memory location 2>
WRITE, <data word for location 2 in array element 1>
etc.

In each case, the data will be written into the Array Element location so long as the Array Element exists and the register or memory location exists and is writeable (some locations may be read-only, some may be only writeable if the Array Element is stopped and not when it is running).

Auto-incrementing Write Operation:—To save time when writing to multiple successive contiguous register or memory locations within a single Array Element—as one might often do when loading an Array Element's program for example—use repeated WRITE commands. The interface in the row node will increment the address used inside the Array Element automatically. For example:

AEID, <array element address>
ADDR, <starting register or memory location—"A">
WRITE, <data for location A>
WRITE, <data for location A+1>
WRITE, <data for location A+2>
WRITE, <data for location A+3>
etc.

Where there are gaps in the memory map, or where it is required to move to another Array Element, use the ADDR or AEID flag again to setup a new starting point for the auto-increment, eg:

AEID, <array element address>
ADDR, <starting register or memory location—"A">
WRITE, <data for location A>
WRITE, <data for location A+1>
WRITE, <data for location A+2>
ADDR, <new starting register or memory location—"B">
WRITE, <data for location B>
WRITE, <data for location B+1>
AEID, <new array element address>
ADDR, <register or memory location>
WRITE, <data word>
etc.

Non-incrementing Write Operation:—Where it is required to defeat the automatic incrementing of the register or memory location address, keep the ADDR flag, together with the WRITE flag:

AEID, <array element address>
ADDR, <register location—"A">
ADDR, WRITE, <data for location A>
ADDR, WRITE, <new data for location A>

It should be noted that there could be a long period of bus inactivity between commands 3 and 4 where the processor array continues to run. In fact, there is no need for any of these bus operations to be in a contiguous burst. There can be gaps of any length at any point. The protocol works like a state machine without any kind of timeout.

Broadcast Write Operation:—It is possible to write to all Array Elements at once, or subsets of Array Elements by group. This broadcast addressing could be indicated by an extra control signal, or be achieved by using special numbers for the AEID address.

In the example implementation, used for the processor array described in GB-A-2370380, the whole array could be addressed on an individual element basis well within 15 bits, so the top bit of the 16 bit AEID address could be reserved for indicating that a broadcast type communication was in progress.

To select Broadcast rather than single Array Element addressing, set the MSB of the AEID data field. The lower bits can then represent which Array Element types you wish to address. In our example processor array, we have 8 array element types, their designations are hard-wired into the configuration of their row-nodes:

| Bits | Description |
| --- | --- |
| [15] | Broadcast Addressing Mode Select |
| [14:8] | Reserved |
| [7] | Type 8 |
| [6] | Type 7 |
| [5] | Type 6 |
| [4] | Type 5 |
| [3] | Type 4 |
| [2] | Type 3 |
| [1] | Type 2 |
| [0] | Type 1 |

So, for example, to address all Type 7 Array Elements:

AEID, <0x8040>
ADDR, < . . . >
etc.

To address all Type 1, Type 2 and Type 4 Array Elements together:

AEID, <0x800b>
ADDR, < . . . >
etc.

Basic Read Request Operation:—The basic read operation is very similar to the basic write operation, the difference being the last flag, and that the data field is ignored:

AEID, <array element address>
ADDR, <register or memory location>
READ, <don't care>

The location will be read from successfully so long as the Array Element exists and the register or memory location exists and is readable (some locations may only be readable if the Array Element is stopped and not when it is running). The data word read from the Array Element will be sent back up the return path bus, in this example to be stored for later retrieval in a FIFO.

Auto-incrementing Read Operation:—Again, very similar to the corresponding write operation:

AEID, <array element address>
ADDR, <starting register or memory location—"A">
READ, <don't care> (data will be fetched from location A)
READ, <don't care> (data will be fetched from location A+1)
etc.

Non-incrementing Read Operation:—Where it is required to defeat the automatic incrementing of the register or memory location address, keep the ADDR flag, together with the READ.flag:

AEID, <array element address>
ADDR, <register location—"A">

ADDR, READ, <don't care> (data will be fetched from location A)

ADDR, READ, <don't care> (data will be fetched from location A)

This could be useful if you want to poll a register for diagnostic information—for example a bit error rate metric.

Broadcast Read Operation:—The hardware in our example processor array does not preclude performing a broadcast read, though its usefulness is rather limited. Readback data from multiple Array Elements will be bitwise ORed together. Perhaps useful for quickly checking if the same register in multiple Array Elements is non-zero before going through each one individually to find out which ones specifically.

Composite Operations:—As seen above, the tokenised style of the bus allows for many permutations of commands of arbitrary length, and allows short-cuts in command overhead to be taken quite often. For example, it may be useful to generate a stream to perform part of a memory test—reading and writing each successive location of a memory:

AEID, <array element address>

ADDR, <starting memory location—"A">

ADDR, READ, <don't care> (data will be fetched from location A, the address WILL NOT be incremented)

WRITE, <data word> (data word will be written to location A, the address WILL be incremented)

ADDR, READ, <don't care> (data will be fetched from location A+1, the address WILL NOT be incremented)

WRITE, <another data word> (another data word will be written to location A+1, the address WILL be incremented)

etc.

There are therefore described a processor array, and a communications protocol for use therein, which allow efficient synchronised operation of the elements of the array.

The invention claimed is:

1. A processor array, comprising:
   a plurality of primary buses, each connected to a same primary bus driver, and each primary bus having a respective plurality of primary bus nodes thereon;
   respective pluralities of secondary buses, each secondary bus connected to a respective one of said primary bus nodes;
   a plurality of processor elements, each connected to one of the secondary buses; and
   delay elements, implemented in the primary bus nodes, for delaying communications with processor elements connected to different ones of the secondary buses by different amounts, in order to achieve a degree of synchronization between operation of said processor elements, wherein each of said primary and secondary buses is a bidirectional bus, for transferring data from the primary bus driver to the processor elements, and for transferring data from the processor elements to the primary bus driver.

2. A processor array as claimed in claim 1, wherein each primary bus node comprises a tap for tapping off a signal from the primary bus driver on the respective primary bus, and a delay line for delaying the tapped off signals.

3. A processor array as claimed in claim 2, wherein at least some of said primary bus nodes comprise a delay element for delaying the signals from the primary bus driver on the respective primary bus.

4. A processor array as claimed in claim 1, wherein each primary bus node comprises a device for combining a signal from the respective secondary bus onto the respective primary bus, and a delay line for delaying the signals from the respective secondary bus.

5. A processor array as claimed in claim 4, wherein the device for combining comprises a bitwise logical OR gate.

6. A processor array as claimed in claim 4, wherein at least some of said primary bus nodes comprise a delay element for delaying the signals towards the primary bus driver on the respective primary bus.

7. A processor array as claimed in claim 1, wherein each processor element is connected to the respective secondary bus at a respective secondary bus node.

8. A processor array as claimed in claim 1, wherein each processor element is connected to the respective one of the secondary buses at a respective secondary bus node, and wherein each secondary bus node comprises a tap for tapping off a signal from the primary bus driver on the respective secondary bus, and an interface for determining whether the tapped off signals are intended for the processor element connected thereto.

9. A processor array as claimed in claim 1, wherein each processor element is connected to the respective one of the secondary buses at a respective secondary bus node, and wherein each secondary bus node comprises a device for combining a signal from the respective processor element onto the respective secondary bus.

10. A processor array as claimed in claim 9, wherein the device for combining comprises a bitwise logical OR gate.

11. A processor array as claimed in claim 1, wherein the primary bus driver has an input bus, and a detector for determining which of said plurality of primary buses should receive data on said input bus.

12. A processor array as claimed in claim 11, wherein the input bus of the primary bus driver has a connection to each of said plurality of primary buses through a first input of a respective AND gate, and said detector is adapted to send an enable signal to a second input of the respective AND gate if it is determined that one of said plurality of primary buses should receive data on said input bus.

13. A processor array as claimed in claim 1, wherein the delay elements, implemented in primary bus nodes which are physically nearer to the primary bus driver, delay communications with processor elements connected to the secondary buses connected to those nearer primary bus nodes, by longer delay times than the delay elements, implemented in primary bus nodes which are physically further from the primary bus driver, delay communications with processor elements connected to the secondary buses connected to those further primary bus nodes.

14. The processor array as claimed in claim 1, wherein the degree of synchronization between operations of said processor elements is achieved by substantially equalizing a time taken for signals to pass from the primary bus driver to each of the processor elements.

15. The processor array as claimed in claim 1, wherein each primary bus is independently driven by said primary bus driver.

16. The processor array as claimed in claim 15, wherein said respective plurality of primary bus nodes are serially connected to each primary bus.

17. The processor array as claimed in claim 1, wherein each of said primary and secondary buses comprises a first bus element configured to transfer data in one direction and a second bus element configured to transfer data in another direction.

* * * * *